US011182703B1

(12) United States Patent
Vaughan et al.

(10) Patent No.: US 11,182,703 B1
(45) Date of Patent: *Nov. 23, 2021

(54) EFFICIENT REPROCESSING OF COMPENSATION CALCULATIONS

(71) Applicant: VERSATA DEVELOPMENT GROUP, INC., Austin, TX (US)

(72) Inventors: Paul W. Vaughan, Austin, TX (US); David A. Brokaw, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,289

(22) Filed: Feb. 11, 2020

Related U.S. Application Data

(63) Continuation of application No. 10/896,687, filed on Jul. 22, 2004, now Pat. No. 10,621,521.

(60) Provisional application No. 60/489,194, filed on Jul. 22, 2003.

(51) Int. Cl.
*G06Q 10/06* (2012.01)
*G06Q 40/00* (2012.01)
*G06F 9/46* (2006.01)

(52) U.S. Cl.
CPC ........... *G06Q 10/063* (2013.01); *G06F 9/466* (2013.01); *G06Q 40/12* (2013.12)

(58) Field of Classification Search
None
See application file for complete search history.

(56) References Cited

U.S. PATENT DOCUMENTS

| 5,404,502 A | * | 4/1995 | Warner | G06F 11/1402 707/999.202 |
| 5,586,313 A | * | 12/1996 | Schnittker | G06Q 40/08 |
| 6,640,244 B1 | * | 10/2003 | Bowman-Amuah | G06F 9/466 707/999.01 |

(Continued)

OTHER PUBLICATIONS

Chandy et al. "Analytic Models for Rollback and Recovery Strategies in Data Base Systems", IEEE Transactions on Software Engineering, vol. SE-1, No. 1, Mar. 1975 (Year: 1975).*

(Continued)

*Primary Examiner* — Shelby A Turner
(74) *Attorney, Agent, or Firm* — Kent B. Chambers; Terrile, Cannatti & Chambers, LLP

(57) ABSTRACT

A transaction processing system includes an engine to process transactions in accordance with rules and data. Changes can be made to the rules and data, transactions, and other parameters that have retroactive affects. The transaction processing system includes a reprocessing system to submit reprocessing requests that prompt a transaction processing engine to efficiently reprocess data to generate accurate output data. In addition to helping ensure accurate output results, the reprocessing operation selectively reprocesses information to avoid unnecessarily reprocessing every transaction. Additionally, embodiment of the compensation system allow parallel processing of current transactions and reprocessing operations using batch processing mechanisms. The transaction processing system can be implemented to perform a variety of transaction processing operations, such as processing of compensation related data.

20 Claims, 8 Drawing Sheets

(56) References Cited

U.S. PATENT DOCUMENTS

| | | | | |
|---|---|---|---|---|
| 6,662,164 | B1* | 12/2003 | Koppelman | G06Q 10/06398 705/14.13 |
| 7,117,172 | B1* | 10/2006 | Black | G06Q 40/00 705/35 |
| 7,467,198 | B2* | 12/2008 | Goodman | G06Q 10/10 709/223 |
| 7,685,006 | B2* | 3/2010 | Rahn | G06Q 40/02 705/3 |
| 8,554,651 | B2* | 10/2013 | Rinne | G06Q 20/367 705/35 |
| 2002/0138376 | A1* | 9/2002 | Hinkle | G06Q 40/02 705/30 |
| 2002/0138449 | A1* | 9/2002 | Kendall | G06Q 20/401 705/75 |
| 2002/0188535 | A1* | 12/2002 | Chao | G06Q 40/02 705/35 |
| 2003/0004840 | A1* | 1/2003 | Gharavy | G06Q 10/06398 705/30 |
| 2003/0026404 | A1* | 2/2003 | Joyce | G06Q 20/32 379/144.01 |
| 2004/0030603 | A1* | 2/2004 | Grundfest | G06Q 30/0601 705/26.1 |
| 2004/0128229 | A1* | 7/2004 | Raines | G06Q 40/02 705/38 |
| 2004/0193439 | A1* | 9/2004 | Marrott | G06Q 10/10 705/30 |
| 2007/0226027 | A1* | 9/2007 | Chang | G06Q 10/00 705/7.24 |

OTHER PUBLICATIONS

Roddick, John F. "A model for schema versioning in temporal database systems." Australian Computer Science Communications 18 (1996): 446-452. (Year: 1996).*

Jensen, C.S. and Snodgrass, R., 1994. Temporal specialization and generalization. IEEE Transactions on Knowledge and Data Engineering, 6(6), pp. 954-974 (Year: 1994).*

Gal, A. and Etzion, O., 1998. A multiagent update process in a database with temporal data dependencies and schema versioning. IEEE Transactions on Knowledge and Data Engineering, 10(1), pp. 21-37 (Year: 1998).*

Response to Non-Final Office Action dated Jan. 16, 2019, filed in U.S. Appl. No. 10/896,687, pp. 1-17.

Non-Final Rejection dated Jul. 16, 2008, filed in U.S. Appl. No. 10/896,687, pp. 1-38.

Response to Non-Final Office Action dated Feb. 29, 2008, filed in U.S. Appl. No. 10/896,687, pp. 1-13.

Non-Final Rejection dated Aug. 30, 2007, filed in U.S. Appl. No. 10/896,687, pp. 1-38.

Amendment after Notice of Allowance (Rule 312) dated Feb. 13, 2020, filed in U.S. Appl. No. 10/896,687, pp. 1-3.

Notice of Allowance dated Nov. 29, 2019, filed in U.S. Appl. No. 10/896,687, pp. 1-11.

Response to Non-Final Office Action dated Nov. 18, 2019, filed in U.S. Appl. No. 10/896,687, pp. 1-14.

Non-Final Rejection dated May 17, 2019, filed in U.S. Appl. No. 10/896,687, pp. 1-17.

Response to Non-Final Office Action dated Feb. 25, 2019, filed in U.S. Appl. No. 10/896,687, pp. 1-17.

Non-Final Rejection dated Sep. 24, 2018, filed in U.S. Appl. No. 10/896,687, pp. 1-12.

Request for Continued Examination dated Mar. 8, 2018, filed in U.S. Appl. No. 10/896,687, pp. 1-26.

Final Rejection dated Sep. 8, 2017, filed in U.S. Appl. No. 10/896,687, pp. 1-15.

Response to Non-Final Office Action dated May 29, 2017, filed in U.S. Appl. No. 10/896,687, pp. 1-20.

Non-Final Rejection dated Dec. 19, 2016, filed in U.S. Appl. No. 10/896,687, pp. 1-13.

Request for Continued Examination dated Feb. 16, 2016, filed in U.S. Appl. No. 10/896,687, pp. 1-32.

Final Rejection dated Aug. 14, 2015, filed in U.S. Appl. No. 10/896,687, pp. 1-45.

Response to Non-Final Office Action dated Apr. 20, 2015, filed in U.S. Appl. No. 10/896,687, pp. 1-26.

Non-Final Rejection dated Oct. 20, 2014, filed in U.S. Appl. No. 10/896,687, pp. 1-51.

Response to Non-Final Office Action dated Jun. 20, 2014, filed in U.S. Appl. No. 10/896,687, pp. 1-20.

Non-Final Rejection dated Dec. 20, 2013, filed in U.S. Appl. No. 10/896,687, pp. 1-39.

Request for Continued Examination Jun. 1, 2010, filed in U.S. Appl. No. 10/896,687, pp. 1-20.

Pre-Brief Appeal Conference Decision dated Dec. 30, 2009, filed in U.S. Appl. No. 10/896,687, pp. 1-2.

Pre-Appeal Brief Request for Review dated Nov. 30, 2009, filed in U.S. Appl. No. 10/896,687, p.-1-9.

Final Rejection dated May 29, 2009, filed in U.S. Appl. No. 10/896,687, pp. 1-36.

* cited by examiner

EFFICIENT REPROCESSING OF COMPENSATION CALCULATIONS

CROSS-REFERENCE TO RELATED APPLICATION

This application claims the benefit under 35 U.S.C. § 119(e) of (i) U.S. Provisional Application No. 60/489,194, filed Jul. 22, 2003 and entitled "Efficient Reprocessing of Compensation Calculations", which is hereby incorporated by reference in its entirety.

BACKGROUND OF THE INVENTION

Field of the Invention

The present invention relates in general to the field of information processing, and more specifically to a system and method for efficiently reprocessing compensation related transactions when data used to support compensation calculations changes.

Description of the Related Art

Companies often pay commissions to sales representatives for products and services sold in accordance with a commission model. Companies generally design commission models to best achieve sales goals and retention of sales representatives. Commission models often take into account many factors such as quantity, sales price, and discounts. Additionally, other factors _may play a role in determining a sales representative's commission. For example, sales representatives may be compensated based on sales by other sales representatives, such as a sales manager being credited for sales achieved by the manager's subordinates, and may be compensated based on past sales. For example, a sales representative's commission may increase after certain goals have been achieved during a given period of time. Certainly many other factors can be included or excluded from the commission model.

Determining commissions can be a relatively simple or a relatively complex and processing intensive operation. Commission calculations by some companies can often be achieved relatively easily when the number of transactions over a given period of time is relatively small, the number of sales representatives is relatively small, and/or the commission model is relatively simple. However, commission calculation by some companies requires an intensive amount of processing and requires powerful compensation systems. Indeed, the number of transactions associated with commissions processed by some companies is on the order of at least hundreds of thousands per day and some millions per day.

Modifying transactions or commission models adds to the already complex and processing intensive operation of determining commissions in the first instance. One method of modifying transactions and, thus, commissions, involves modifying a commission model, discarding all previously processed commissions, and reprocessing all transactions in accordance with the modified model. However, many compensation systems do not have enough excess processing capacity to reprocess transactions and stay current with processing requirements of current transactions. Other conventional systems duplicate transactions prior to reprocessing. Such duplication often requires significant database resources and causes delays due to read/write database operations. As a result, companies often have to choose between undesirable delays coupled with expanded resource usage in processing commissions or using out-dated commission models and inaccurate transaction data.

SUMMARY OF THE INVENTION

In one embodiment, a method of efficient reprocessing transactions affected by data changes in a commission system includes receiving data in the commission system, determining if any of the received data alters any previous commission calculations, if any commission calculations were altered, identifying transactions associated with the altered previous commission calculations, and reprocessing the transactions determined to have been associated with the altered previous commission calculations. In a further embodiment, transactions are compared in memory without writing to a database.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Overview

Figure 1:
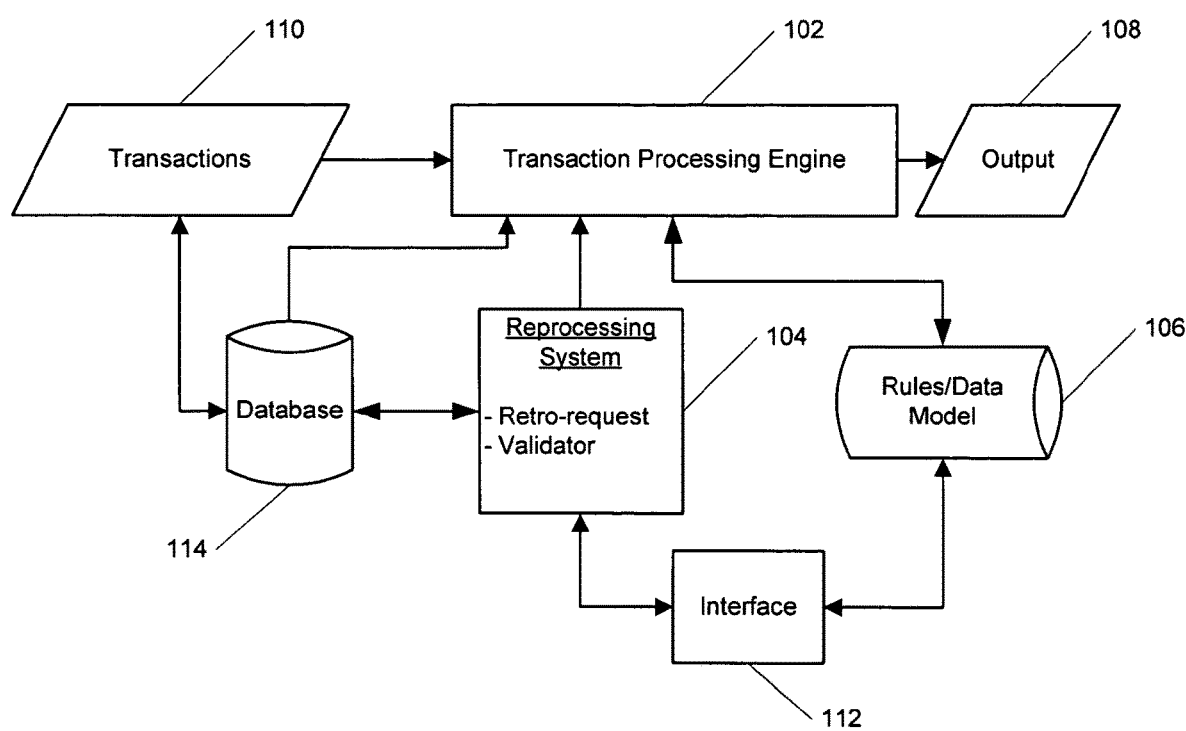
FIG. 1 depicts a transaction processing system having a selective reprocessing engine.

FIG. 1 depicts one embodiment of a transaction processing system 100 having a transaction processing engine 102 and a selective reprocessing system 104. The transaction system is implemented utilizing hardware and/or software. In general, the transaction processing engine 102 accesses a rules/data model 106, generally stored in a database, to determine compensation for participants. The transaction processing engine 102 receives transaction data 110 as an input. Transaction data 110 is generally stored in a database 114. The transaction processing engine 102 applies rules and data associated with the transaction data 110 to generate output 108, such as ledger items that reflect compensation amounts due participant(s). A "participant" includes an individual, such as a sales representative, or a group, such as a sales team, who participates in a particular compensation arrangement. The rules/data model 106 is, for example, a compensation model that models the compensation arrangement.

An interface 112 to the rules/data model 106 allows a user to modify transaction data 110 and/or rules/data model 106. The reprocessing system 104 is notified or determines that a change has been made to the transaction data 110 and/or rules/data model 106 and validates that the change requires reprocessing of previously processed transaction data 110.

Upon validation, the reprocessing system 104 issues a retro-request to the transaction processing engine 102, which reprocesses the transaction data 110 or, in some embodiments, reprocesses objects, such as quota states, that store information related to processed transaction data 110. As described in more detail below, embodiments of the transaction processing system 100 provide efficient reprocessing, thus, making changes to transaction data 110 and rules/data model 106 practical.

Figure 2:
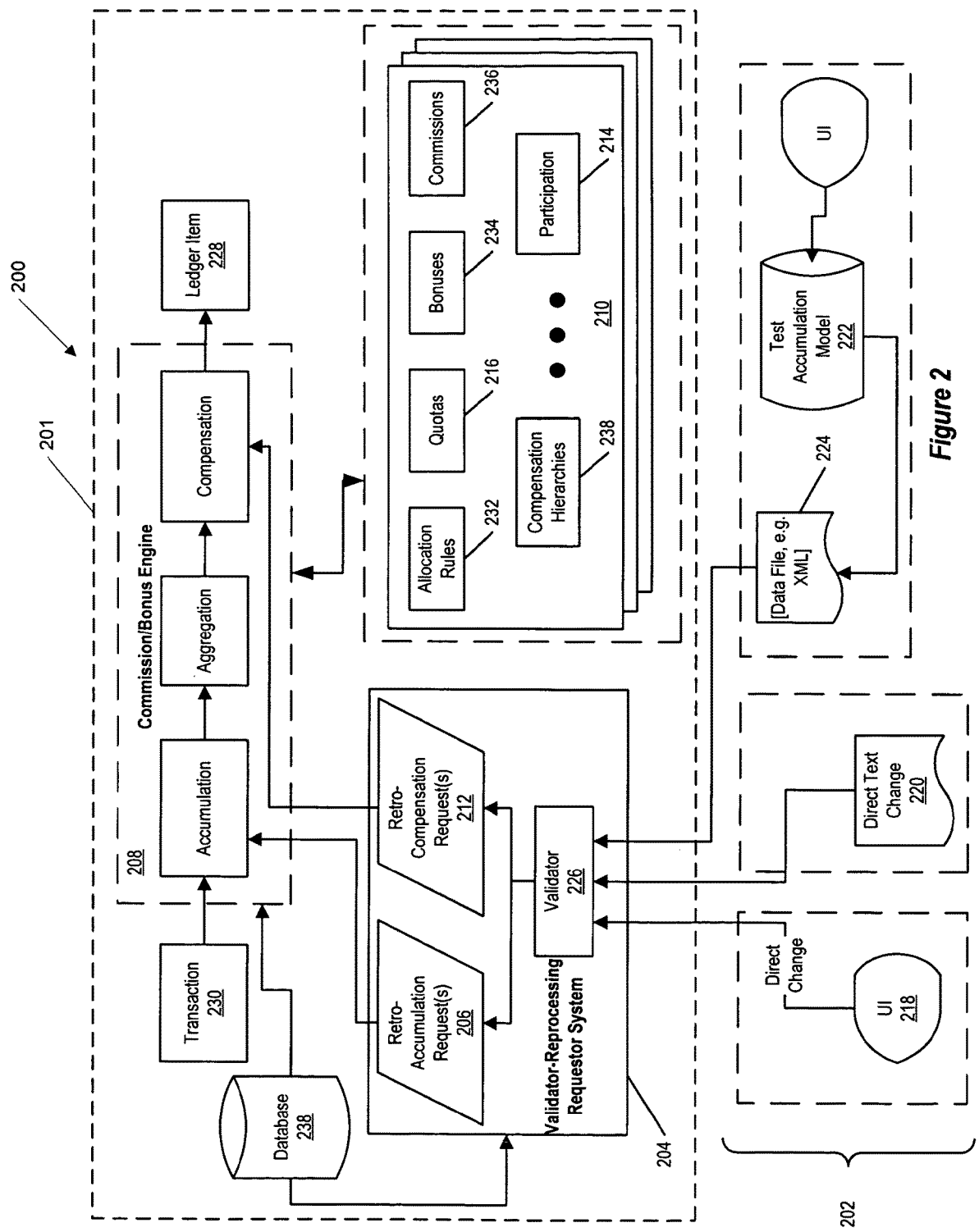
FIG. 2 depicts a compensation system with a validator-reprocessing requestor system.

One particular application of transaction processing system 100 is in the field of compensation systems and the determining of compensation for participants based on transaction data and processing rules. FIG. 2 depicts a compensation system 200, which is one embodiment of transaction processing system 100. Compensation system 200 includes specific components tailored to the design of a compensation system that includes efficient reprocessing capabilities. The compensation system 200 accommodates multiple compensation factors that affect the determination of commission calculations within the compensation system. Previously determined compensation calculations can be altered when compensation factors change, such as transaction data, commission model changes, participant changes, and compensation hierarchy changes. These changes and others may require retroactive processing (also referred to as reprocessing) of transaction data. However, some changes in a commission model do not affect previously determined commission calculations.

Embodiments of the compensation system described herein utilize novel retroactive processing (also referred to as "reprocessing") to help ensure that compensation results are correctly updated in response to retroactive changes to data that affect compensation results without unnecessarily reprocessing every transaction. Additionally, embodiment of the compensation system allow parallel processing of current transactions and reprocessing operations. The batch processing mechanisms described below represent one embodiment of a mechanism that facilitates efficient, parallel reprocessing.

In a retroactive scenario, a commission commission/bonus engine has already calculated participant performances and created appropriate ledger items. Retroactive processing starts with the recognition that a retroactive change has been made and an assessment of what the change could possibly affect. To perform retroactive processing, the compensation system monitors data input, recognizes when a change in data has occurred, assesses whether the data change affects previous compensation results, and conduct efficient reprocessing of transactions associated with affected compensation results. In addition to novel recognition of retroactive changes, in one embodiment, the compensation system also utilizes efficient batch reprocessing techniques that prevent overloading the compensation system with reprocessing operations, thus allowing processing of current, on-going transactions to proceed in an essentially uninterrupted course.

Additionally, multiple mechanisms can be used to make data changes that may affect commission calculations. Such changes lead to reprocessing of transactions and generation of updated, correct ledger items. For example, data changes can occur in the form of direct changes to transactions or to a commission model. Data changes can also be received through input data received via a user interface of a networked computer. Data changes can be the result of staging operations in which test commission models are being generated and/or incorporated into the active commission model. Embodiments of the compensation system herein recognize data changes received from multiple mechanisms and provide an efficient centralized processing platform.

Retroactive Changes

As mentioned above, users may enter changes using any of a variety of mechanisms. Changes that affect compensation current compensation results, as reflected in ledger items are referred to herein as "retroactive changes" or "retroactive data changes": FIG. 2 depicts three such mechanisms, collectively referred to as editor mechanisms 202. A user, which can be a person or an automated process, can enter changes to one or more transactions or to the compensation model 210 through a user interface 218. The user interface is supported by a client data processing system in communication with a compensation processing system 201. Additionally, a user with direct access 220 to transactions or the compensation model 210 can directly enter data changes to the compensation model 210. Direct access generally uses application programming interfaces or other programmatic access.

The compensation system 200 also facilitates data changes resulting from testing and staging operations. A test accumulation model 222 can be generated by a user, translated into an accumulation model data format such as XML data file 224, and, for example, processed against transactions for compensation analysis.

The compensation processing system 201 includes a validator-reprocessing requestor system 204. The validator-reprocessing requestor system 204 provides a centralized mechanism for accommodating retroactive data changes. The validator-reprocessing requestor system 204 includes a validator 226, which can be an object in an object-oriented programming environment. The validator 226 becomes active when data, such as a new compensation model 210 is checked in to compensation processing system 201. "Checking in" is a process that includes storing anew version of a compensation model 210 or modifications to a compensation model 210 in a database and making the compensation model 210 available for access by the commission/bonus engine 208.

The validator 226 includes logic of any well-known type to recognize changes between existing data and newly provided data. In one embodiment, new data includes effectivity dates that provide a primary data property that allows the validator 226 to ascertain which calculated compensation results and corresponding transactions are potentially affected by retroactive data changes. An example effectivity date would be for a performance measure. For example, "Performance measure 1" associated with a particular quota could indicate that a participant gets a performance increment of "unitPrice*quantity" for each qualifying transaction during a particular effectivity interval. "Performance measure 2" could have an effectivity interval immediately following that for Performance Measure 1 and extending indefinitely that says the participant receives "(unitPrice−discount)*quantity" because of, for example, overpayment concerns. However, the change is not made retroactive due to contractual (or good faith) reasons. Keeping both in the system allows the compensation system 200 to reprocess old transactions as necessary according to the old rule while processing newer transactions according the new rule. It also allows a user to, for example, enter the new rule without having it become immediately effective or make the new rule effective retroactively for some specific period. In general, effectivity dates are user-set Start Dates and End Date values on elements of the compensation model 210. For example, Start/End date value fields may exist for general allocation rules, quota/commission eligibility formulae, quota performance measurement formulae, commission value formulae, and bonus rules.

Additionally, effective period dates may change and prompt a reprocessing request. For example, Start/End dates can change for participation hierarchies, additional periods may be added to a quota.

Referring to FIG. 2, in one embodiment, two types of data changes may require reprocessing of affected transactions and generation of a reprocessing request:

(1) Changes To Processed Transaction. If a user modifies a previously processed transaction using an editor mechanism such as editor mechanisms 202, the ledger items 228 containing compensation data generated by compensation system 200 and performances related to this transaction may not reflect the correct values. The transaction is thus added to a new batch for reprocessing, as discussed in more detail below, in order to update compensation results so that the ledger items 228 reflect correct values. The validator-reprocessing requestor system 204 produces retro-accumulation request(s) 206 to notify the commission/bonus engine 208 that retroactive processing is desirable for a particular transaction; and (2) Changes To The Compensation Model 210. When a user modifies a compensation model 210 or other parameters that affect compensation, such as the compensation hierarchy changes, quotas, bonus data, and participation data, the existing performance values and ledger items 226 may no longer represent a correct outcome of the current compensation model 210. All transactions for the duration in which the change was made may need to be reprocessed and sales representatives (producers) may need to be re-compensated to ensure that the compensation results are correctly updated. The validator-reprocessing requestor system 204 produces retro-compensation request 212 to notify the commission/bonus engine 208 that retroactive processing is desirable for a particular bonus and period. The validator-reprocessing requestor system 204 produces retro-accumulation request(s) 206 to notify the commission/bonus engine 208 that retroactive processing is desirable, as described in more detail below, for a particular transaction(s) when ledger item(s) 238 associated with the transaction(s) may be inaccurate due to changes of compensation model 210.

The commission system 200 utilizes a compensation model 210 and a commission/bonus engine 208. An example embodiment of an accumulation model, a commission/bonus engine, and a corresponding process used to calculate commissions in the first instance is described in U.S. patent application Ser. No. 09/081,857 entitled "Method and Apparatus for Determining Commission", inventors Joshua Koppelman et al. and assigned to Trilogy Development Group, Inc., which is hereby incorporated by reference in its entirety and referred to as the "Koppelman Application".

The compensation model 210 includes data components accessible by the commission/bonus engine 208 to allow commission/bonus engine 208 to determine a ledger item 238 based on accumulated performance data obtained from multiple transactions 230. Data components included in the compensation model 210 are a matter of design choice as needed to model a compensation system and may be implemented as objects in an object oriented programming environment. One example property of the components of compensation model 210 is an effectivity date. For example, each bonus component 234 includes a ProcessedDate property indicating the most recent date on which commission/bonus engine 208 processed bonus component 234. The ProcessedDate property allows the commission/bonus engine 208 to avoid reprocessing when nothing has changed.

Each bonus component 234 also includes an AlwaysProcess property, which if "true" indicates that a particular bonus component 234 should be processed each time commission/bonus engine 208 processes bonuses. In one embodiment, the commission/bonus engine 208 processes particular periods for bonuses if the associated quotas and quotaInstances (periods) have changed. Only then does it examine AlwaysProcess, which tells the commission/bonus engine 208 to process a particular quotaState (individual participant's performance) even if it hasn't changed. This may be desirable, for example, if bonus rules are based on rankings, and a participant's ranking could change even when his performance didn't simply because the performance of other participants changed. Each of quota components 216 include a ChangeDate property that indicates the last time the quota 216 was changed. Examples of compensation model 210 components are also included in the Koppelman Application.

Additionally, compensation model 210 may include numerous individual sub-models to accommodate different calculation data for different compensation plans. Different compensation plans may be developed to accommodate, for example, different affiliates within a company, different customer contract terms, etc. Example compensation model 210 components are allocation rules 232, quotas 216, bonuses 234, compensation hierarchies 238, and participation 214.

Figure 3:
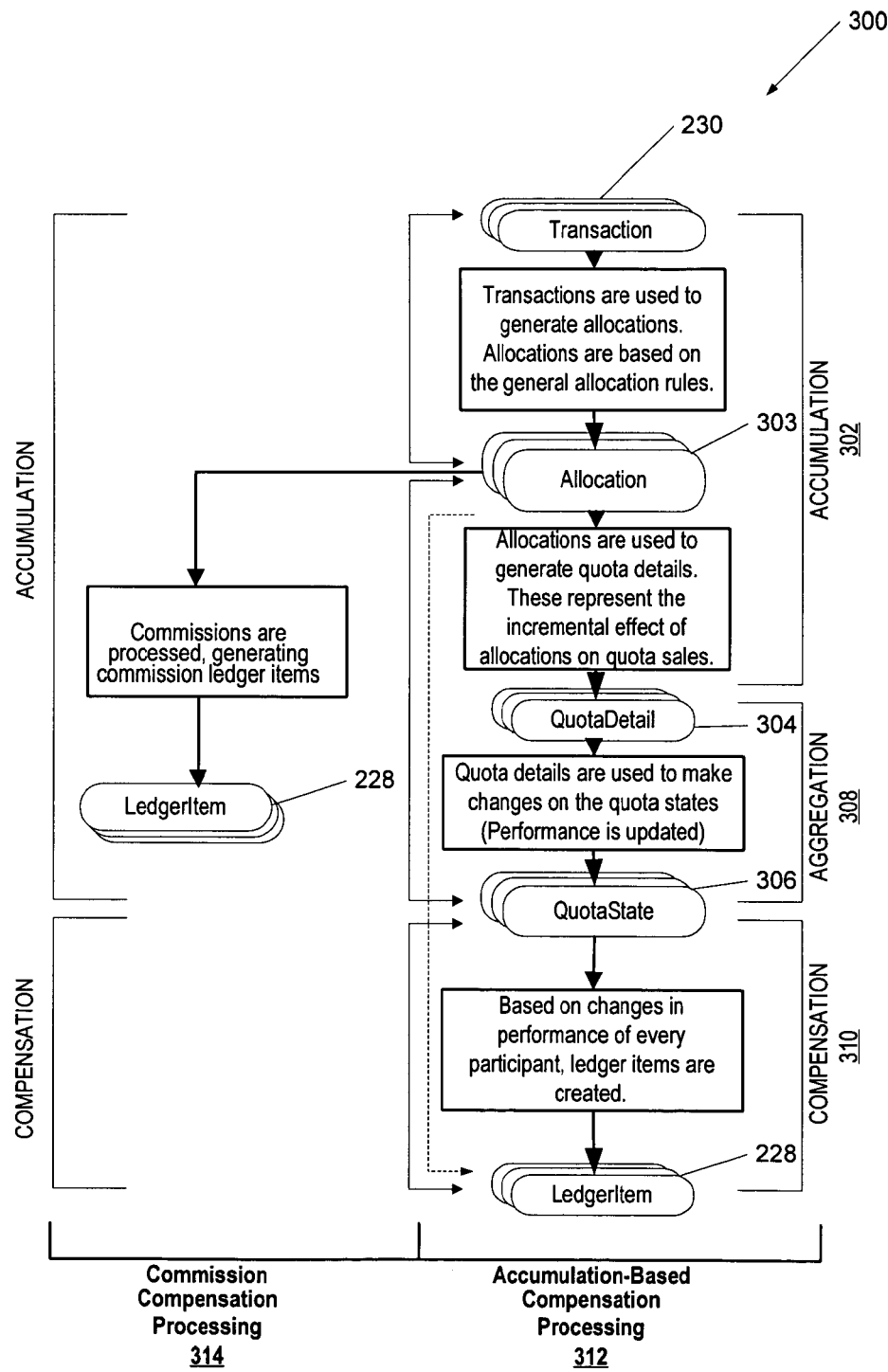
FIG. 3 depicts processing by a commission/bonus engine within the compensation system of FIG. 2.

Referring to FIGS. 2 and 3, the data inputs to the compensation system 200 are a set of compensation transactions 230. The compensation system 200 produces allocations, which record credit allocation, and produces quota details, which record updates to performance of participants. In one embodiment, quota details are generated during accumulation but quota states are updated in the separate aggregation phase as described in more detail below. Quota states store current performance data for a given participant over a given period of time for a given quota. A quota state includes start and end dates and a nominal period relative to a quota. Start/end dates are allowed to be changed. A quota state includes data on a target performance for a participant, which can be changed, causing appropriate reprocessing as described below.

Transactions 230 are data that represent a specific activity, such as product or services sales related information. Transactions 230 include data fields. Example transaction data fields and a brief description thereof are presented in Table 1.

TABLE 1

| Property | Description |
| --- | --- |
| Agreement | The agreement under which the transaction's product was sold or serviced. |
| Allocated | Indicates if the transaction has been processed through the accumulation phase of the commission/bonus engine 208 to generate allocations. |
| BatchNumber | The batch number. In one embodiment batch numbers are assigned in monotonically increasing order. The commission/bonus engine 208 only processes transactions that have a batch number greater than or equal to a CurrentBatch value (identification number of the current batch being processed) of the accumulation model 208. A transaction is |

TABLE 1-continued

| Property | Description |
| --- | --- |
| | associated with its batch record through the corresponding BatchNumber property in a BatchRecord object. |
| Cancelled | Indicates if the transaction has been cancelled. |
| Ignore | Indicates if the transaction should be ignored. The transaction will not be processed if this is true. |
| Jurisdiction | The jurisdiction in which the transaction's product was sold or serviced. The jurisdiction values are defined in the Jurisdiction enumeration. |
| Model | The accumulation model 208 under which the transaction will be processed. This is the sub-model of the accumulation model 208 from which the agreement was created. |
| NumAllocs | The number of allocations generated for this transaction as a result of compensation processing. |
| Product | The product that was sold or serviced. |
| Quantity | A numeric amount associated with the transaction, if any. |
| SalesTeam | The producer or distributor who sold or serviced the transaction's product. |
| SubJurisdiction | The subjurisdiction in which the transaction's product was sold or serviced. The subjurisdiction values for jurisdiction X are defined in the SubJurisdiction.X enumeration. |
| TotalWeight | The total weight of all allocations generated for the transaction as a result of compensation processing. |
| TransDate | The transaction date to be used for compensation processing. |
| TransType | Optional for recording additional information about transactions. |
| UnitPrice | Optional to record a numeric amount associated with the transaction. |

The compensation system 200 includes two processing modes, accumulation-based compensation process 312 and commission compensation process 314. The accumulation based compensation process 321, in one embodiment, divides a compensation process 300 into three major operational phases of the commission/bonus engine 208:

Accumulation

Aggregation

Compensation

The accumulation phase 302 determines who receives credit for compensation transactions 230 and determines what performance updates result for producers and managers participating in the agreement. The input to the accumulation phase is a set of compensation transactions 230 and the outputs are a set of allocations 303 that record credit allocation and quota details 304 that record updates to performance. For example, the accumulation process determines what performance updates result for producers and managers participating under a particular agreement represented by a sub-model of compensation model 210. The input to the accumulation phase is a set of compensation transactions 230.

The aggregation phase 308 updates all quota state objects based on the quota detail objects that were written in the accumulation phase. Quota state objects are updated with the incremental values from the quota detail objects directly in a database. A quota state is like a bucket that tracks performance information for a participant as allocations are processed. As participants receive additional credit allocations over time, their performance values will increase in the quotas in which they participate. In one embodiment, quota state objects are not loaded into memory because if quota state objects were loaded into memory prior to accumulation or aggregation, they would not be updated in memory with the new performance values. If the compensation phase ran while the quota state objects were still loaded in memory, the compensation phase would not work as expected.

A quota 216 creates a quota state for each participant in the quota 216 for each tracking period. For example, if a quota 216 has tracked performance for 20 periods and there are 27 participants participating in the quota 216 during each period, the quota 216 will have a total of 270 quota states.

Compensation phase 310 is the process of computing how much money producers or managers should receive based on their accumulated performance.

The compensation phase 310 creates ledger items 228, from which payments can be generated. The algorithm of this phase is as follows:

1. For each bonus, the commission/bonus engine 208 verifies if any related quota has changed since the bonus was last processed.
2. Within that quota, the commission/bonus engine 208 verifies if any quota instance has changed since the bonus was last processed.
3. For each quota state that has changed within the quota instance, the commission/bonus engine 208 computes the total expected compensation minus the actual compensation to the present moment and creates a ledger item for the difference.

The commission compensation process 314 represents a direct compensation process. Commission compensation processing 314 calculates commissions directly based on compensation transactions 230. This differs from accumulation-based compensation processing in that there is no accumulation of sales performance by discrete time periods, and therefore no need for quotas. Commission compensation calculates commissions based directly on individual transactions 230, and accumulation-based compensation calculates bonuses based on accumulated sales performance. An advantage of commission compensation is that the commission paid out is associated with the compensation transaction 230 that led to it.

In commission compensation, commission is calculated for each individual sale. The dollar amount for the commission is typically a flat rate multiplied by a particular amount stored on the compensation transaction 230. Each compensation transaction 230 can result in multiple allocations, and each allocation has the potential to result in commission being paid out under each commission.

In contrast, in accumulation-based compensation, a bonus is calculated on the basis of a group of sales falling within a particular time period. Performance is calculated for each sale and totaled for the period. A bonus is ultimately paid out based on the performance attained during the entire period.

Commission compensation processing occurs during the accumulation phase of the commission/bonus engine 208.

Retroactive Processing

This section describes how reprocessing of direct compensation and accumulation-based compensation information is handled when retroactive changes are made to compensation-related data.

There are generally two major types of retroactive changes that can be made:

1. Individual compensation transaction 230 changes; and
2. Model 210 changes. This includes changes to contract kit items such as quotas, bonus, and commissions, as well as changes to compensation hierarchies and participation.

These types of changes are different in nature, and are thus processed differently. The following sections describe how the change types are handled.

Individual compensation transactions 230 can be changed using one of the editor mechanisms 202 or programmatically. If a previously processed transaction 230 is changed, it is scheduled for reprocessing when the commission/bonus engine 208 is next run by immediately giving the transaction 230 a new batch number.

In one embodiment, reprocessing utilizes a batch processing mechanism, described in more detail below, to facilitate efficient, parallel reprocessing. In general, the transactions 230 are either added to an existing batch waiting reprocessing that is not full, otherwise transactions 230 are added to a new reprocessing batch. The transactions 230 will then be reprocessed automatically the next time accumulation processing occurs. By using batch reprocessing, the number of requests for reprocessing is reduced by the number of transactions per batch.

In one embodiment, retroactive changes to a compensation model 210 include changes to compensation hierarchies, participation, targets, and the contract kit, including quotas, bonuses, and commissions. In each case, the associated validator 226 recognizes that a change is retroactive and creates a request for retroactive processing. The process of recognizing retroactive changes is a design choice and can be customized appropriately. For example, customization can allow additional reductions in the amount of retroactive processing required. While one embodiment creates retro requests efficiently but conservatively, to ensure correctness for the largest number of possible models, customizations could be more efficient based on knowledge of the required semantics and usage of a particular model.

Reprocessing of compensation for identified bonus periods involves the following steps: (1) the commission/bonus engine 208 checks for retro-compensation requests 212 to reprocess bonuses for one or more given periods; (2) for reprocessing quota states, if a request exists for a particular bonus/period, the commission/bonus engine 208 recalculates the compensation for that period; (3) the commission/bonus engine 208 then nullifies any ledger items for participants who no longer participate. The ledger items that no longer belong to any quota state or any bonus are called orphaned ledger items.

Two types of retroactive processing requests can be created, depending on what part of the model has been changed:

1. retro-accumulation request(s) 206—Identify transactions 230 to be reprocessed.
2. retro-compensation request(s) 212s—Identify bonus periods for which the compensate phase must be reprocessed.

In one embodiment, no retroactive processing requests are generated for retroactive individual transaction 230 changes because the transaction 230 batch numbers are immediately updated for reprocessing during the next commission/bonus engine 208 run. A retro-accumulation request(s) 206 object identifies transactions 230 to be reprocessed using, for example, an object query language (OQL) query. The query is executed by the commission/bonus engine 208 during retro-accumulation request(s) 206 processing. Retro-accumulation request(s) 206 objects are created by validators 226 when retroactive changes are made to a compensation model 210. The requests are then saved in a database for later processing. In another embodiment, a user could manually, or through a programmatic interface, create retro accumulation requests that specify the nature of the retro-accumulation request, such as "reprocess last [period of time, e.g. month, quarter, or year]."

Table 2 describes the properties of the retro-accumulation request(s) 206.

TABLE 2

| .Property | Description |
| --- | --- |
| CreatedDate | The date on which the request was created. This generally corresponds to the date the retroactive change was made to the model. |
| CreationBatchNumber | The batch number of the compensation model 210 at the time of the creation of the request. Only transactions 230 with a batch number less than this value are considered for reprocessing because other transactions 230 will be processed after the change was made. |
| Ignore | Indicates if the request should be ignored. If true, the request is not processed. |
| Max.Batch | The maximum transaction 230 batch number generated for this request. This value is set during retro-accumulation request(s) 206 processing. |
| MinBatch | The minimum transaction 230 batch number generated for this request. This value is set during retro-accumulation request(s) 206 processing. |
| Model | The model to which the request applies. |
| OQLQuery | The query that is executed during retro-accumulation request(s) 206 processing to identify the transactions 230 requiring reprocessing. |
| Processed | Indicates if the request has been completely processed. |
| ProcessedDate | The date on which the request was processed. |

In one embodiment, validator 226 generates stock OQL queries to identify transactions 230 requiring reprocessing based on changes to the compensation model 210. Following are some sample queries for different model changes:

Change a leaf position holder from position holder A to position holder B retroactively. This could generate a retro-accumulation request(s) 206 object using the following query:

SELECT t FROM Transaction 230 t WHERE (t.SalesTeam='<position holder A GID>' OR t.SalesTeam='<position holder B GID>') AND t.TransDate>=<B start date> AND t.TransDate<<Bend date>

Change a performance measure formula.

SELECT d.Allocation.Transaction 230 t FROM QuotaDetail d WHERE d.Quota='<quota GID>' AND t.TransDate>=<start date> AND t.TransDate <<end date>

A retro-compensation request(s) 212 object identifies a particular bonus period that needs to be reprocessed. The retro-compensation request(s) 212 indicates a period of the bonus' primary quota for which reprocessing mustoccur.

Table 3 describes the properties of the retro-compensation request(s) 212 class.

TABLE 3

| Property | Description |
| --- | --- |
| CreatedDate | The date on which the request was created. This generally corresponds to the date the retroactive change was made to the compensation model 210. |
| Ignore | Indicates if the request should be ignored. If true, the request is not processed. |

TABLE 3-continued

| Property | Description |
| --- | --- |
| Period | The period number of the primary quota of the bonus for reprocessing. |
| Processed | Indicates if the request has been completely processed. |
| ProcessedDate | The date on which the request was processed. |
| Promotion | The bonus for reprocessing. In one embodiment, the bonus is only reprocessed for the period of the primary quota indicated by the Period property. |

Once the commission/bonus engine 208 receives a retro-accumulation request 206 and/or retro-compensation request 212, several general operations occur. The commission/bonus engine 208 processes retro-accumulation request(s) 206. The number of transactions 230 that will be reprocessed can be limited using batches as described in more detail below. Retro-accumulation request(s) 206 provide information about transactions 230 that need processing, and the commission/bonus engine 208 marks those transactions so that they are selected during the next transaction processing. New batches are created and marked as reprocess batches. Each of the identified transactions is assigned to a reprocess batch. During accumulation processing for a reprocess batch, the output in terms of allocations and ledger items is computed as normal and compared with any existing allocation and ledger items from previous processing. The new outputs and cancellations of the old outputs are saved in the database as necessary.

Unlike retro-compensation request(s) 212 objects, the retro-accumulation request(s) 206 objects themselves do not form direct inputs for commission/bonus engine 208 reprocessing. Instead, there is an intermediary step where the retro-accumulation request(s) 206 objects themselves are processed. The result of processing the requests is that transactions 230 are updated so they will be reprocessed when the commission/bonus engine 208 is run.

The commission/bonus engine 208 examines the retro-accumulation request(s) 206 objects that have not been processed (as indicated by their Processed property) and processes them. During processing, the commission/bonus engine 208 executes the queries on the request objects to identify transactions 230 requiring reprocessing, and assigns the transactions 230 a new batch number and batch record. This marks the transactions 230 for reprocessing during the next commission/bonus engine 208 run. Advantageously, since reprocessing handles transactions that are already marked as processed and updates the output to be correct, there is no need to first cancel the original transactions, duplicate them and process the duplicates.

The commission/bonus engine 208 reprocesses individual transactions 230 and bonuses as required, ensuring the final compensation outputs reflect retroactive changes.

Figure 4A:
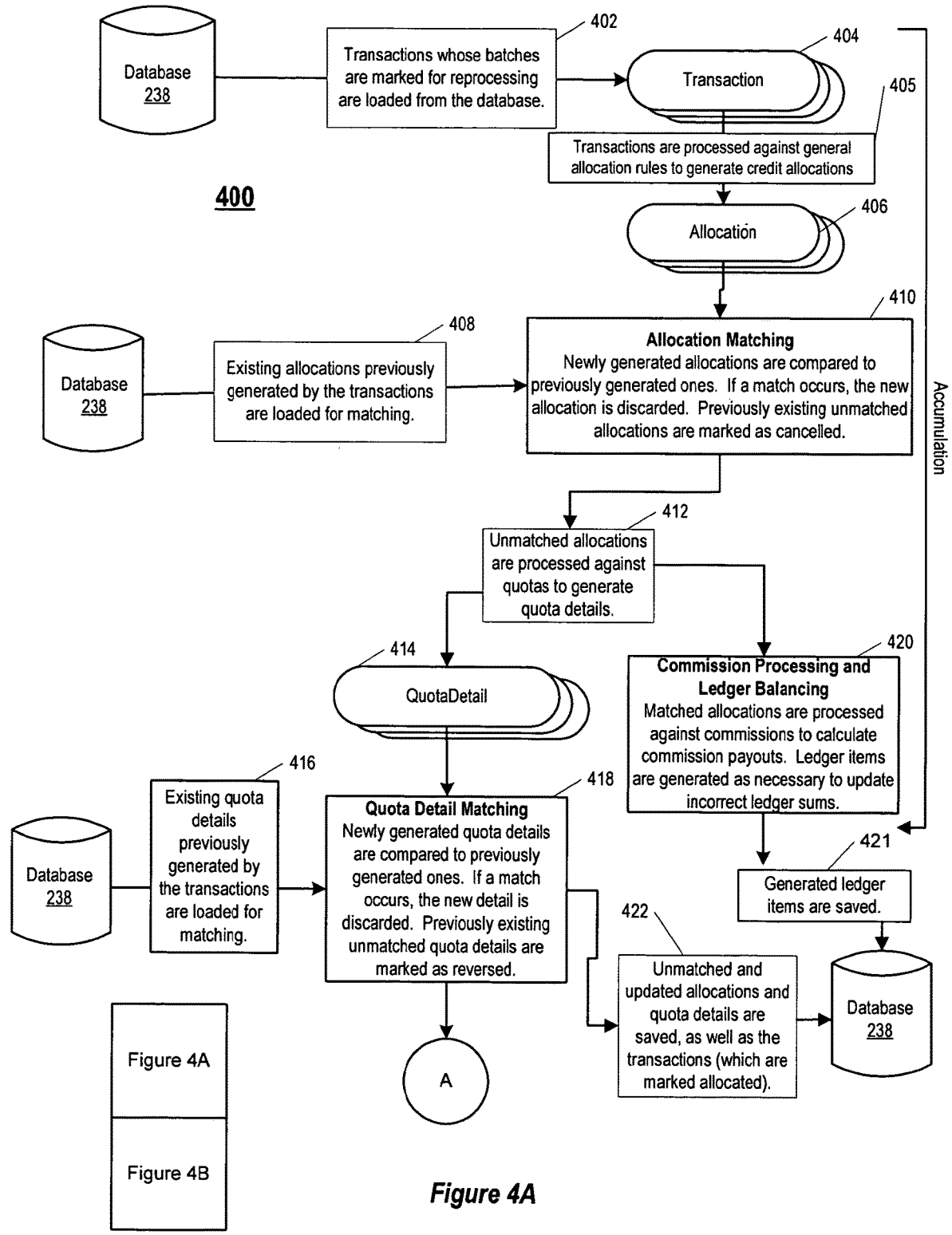
FIGS. 4A and 4B (collectively "FIG. 4") depict a transaction reprocessing process.
Figure 4B:
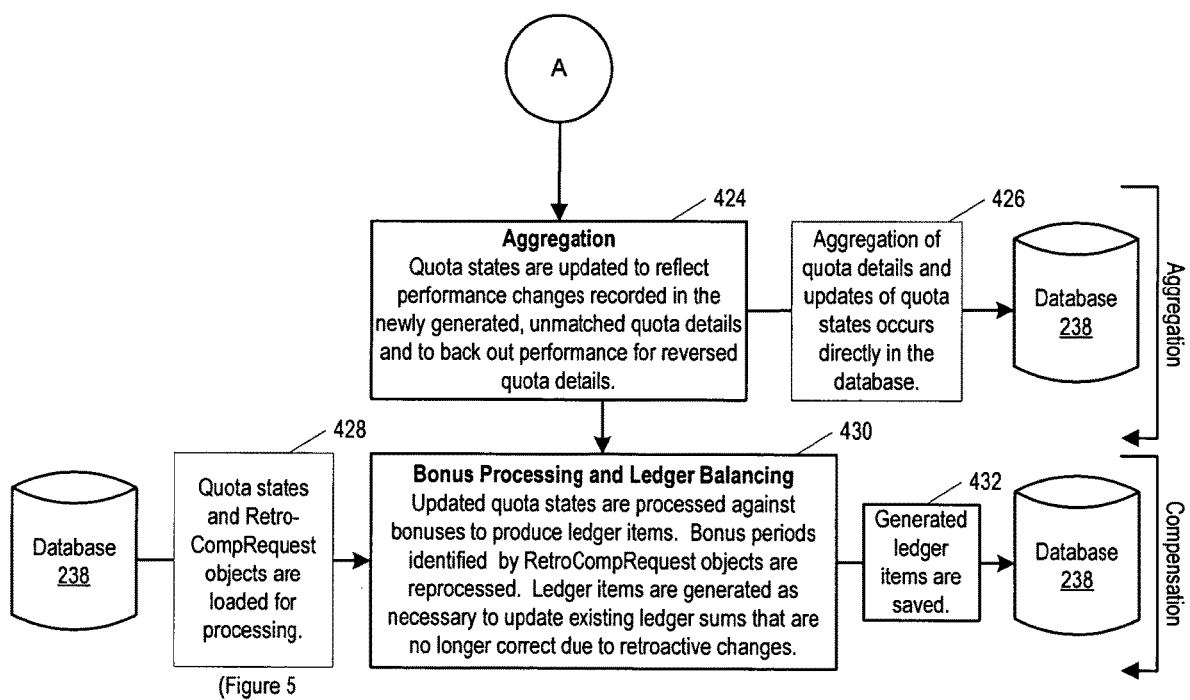

Referring to FIG. 4, reprocessing operation 400 is performed by the commission/bonus engine 208. In operation 404, the commission/bonus engine 208 processes transactions 230 retrieved from database 238 that have been marked for reprocessing in operation 402. Even though these transactions 230 have already been processed, the commission/bonus engine 208 will process them again because they have a new batch number and their associated batch record BatchRecord indicates they are to be reprocessed.

In operation 405, when the commission/bonus engine 208 processes a batch of transactions 230 marked for reprocessing, commission/bonus engine 208 computes which allocations 406 and quota details should exist based on the current compensation model 210. In operation 408, the commission/bonus engine 208 also queries for the allocations and quota details in database 238 that already exist for transactions 230 in the batch.

In operation 410, the commission/bonus engine 208 then compares the newly generated allocations 406 and quota details to the existing ones returned by the query in operation 408. Newly generated allocations that match previously generated allocations are not returned or saved, thus, preventing unnecessary reprocessing. Unmatched previously generated allocations are cancelled and the corresponding quota details are reversed. Operation 410 uses system memory thus eliminating the conventional process of writing to database 238. In operation 412, unmatched allocations are processed against quotas 216 to generate quota details 414.

In operation 416, previously generated quota details by the transactions 230 marked for reprocessing are loaded into system memory. In operation 418, the commission/bonus engine 208 conducts a quota detail matching operation which compares newly generated quota details 414 to previously generated quota details. If a match occurs, the newly generated quota detail 414 is discarded without, in one embodiment, a write operation to database 238, and previously existing unmatched quota details are marked as reversed. By avoiding a write operation to the database 238, the reprocessing operation can proceed faster and more efficiently than an operation requiring a database write operation. The new allocations 406 and quota details 414, as well as allocated transactions 230, are saved by operation 422 in database 238 and returned for later processing in the aggregation and compensation phases of the commission/bonus engine 208.

In the aggregation phase, operation 424 updates quota states to reflect performance changes recorded in the newly generated, unmatched quota details. Performance data associated with reversed quota details are reversed. In one embodiment and pursuant to operation 426, aggregation of quota details and updates of quota states occurs directly in database 238.

In the compensation phase, quota states and any retro-compensation request(s) 212 are loaded in operation 428 for processing by operation 430. Operation 430 is expanded upon in more detail in FIG. 5. In operation 430, updated quota states are processed against bonuses 234 to produce ledger items 228. Bonus periods identified by retro-compensation request(s) 212 are reprocessed. Ledger items 228 are generated as necessary to update existing ledger sums that are no longer correct due to retroactive changes. Operation 432 loads the generated ledger items 228 into database 238.

In operation 420 for the commission compensation process 314, the commission/bonus engine 208 compares the matched set of allocations against commissions to calculate commission payouts. These calculated commission amounts are compared to the sums of the existing ledger items 228. If the existing ledger sum is different than the calculated amount, a new ledger item 228 is created for the negative of the current ledger sum to cancel it, and then a new ledger item 228 is created for the correct sum and saved in database 238 by operation 421.

Compensation Reprocessing

Figure 5:
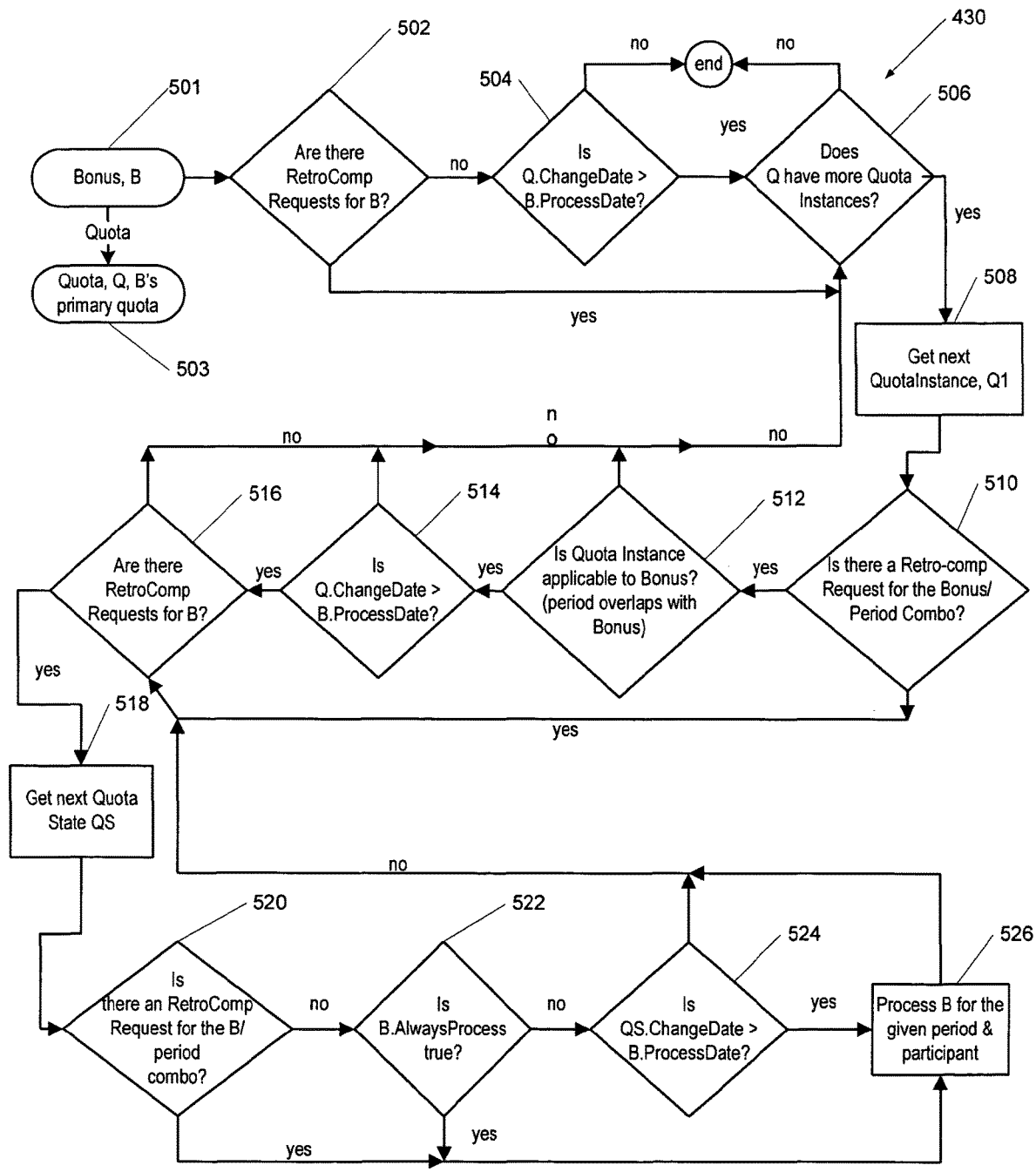
FIG. 5 depicts a filtering operation to efficiently select transactions for reprocessing that are affected by recent data changes to the compensation system of FIG. 2.

Referring to FIG. 5, the commission/bonus engine 208 processing is naturally retroactive in nature, in that it calculates how much should be paid to a participant based on a particular bonus 501, determines how much has already been paid by examining the Ledger Items 228 objects, and pays the difference. The bonus processing logic 430 in FIG. 5 represents one embodiment of operation 430 that determines which, if any, quota states commission/bonus engine 208 will load for reprocessing as a result of receiving a retro-accumulation request 206. The selective bonus processing logic of operation 430 provides further reprocessing efficiencies by selectively choosing quota states that may be affected by recent changes to transactions or to the compensation model 210. In general, effectivity dates can be used to filter out quota states that are unaffected by the retro-accumulation request 206.

If a retroactive change is made to a contract kit that requires reprocessing of a bonus, a retro-compensation request(s) 212 object is generated. The commission/bonus engine 208 processes retro-compensation request(s) 212 objects directly during the compensate phase.

Even though the performance of a quota may not have changed since the bonus was last processed, if a retro-compensation request(s) 212 indicates a bonus should be reprocessed for a given period, the bonus is reprocessed. The reprocessing occurs against all quota states that exist for the specified period of the quota. In one embodiment, compensation system 200 does not restrict reprocessing of a bonus to specific participants.

In operation 502, the commission/bonus engine 208 determines whether any outstanding retro-compensation request(s) 212 exist for bonus 501. Bonus 501 represents each of bonuses 234 as they are individually processed by operation 430. If no, operation 504 determines whether the primary quota 503 associated with the bonus 501 under consideration was changed since the bonus 501 was last processed by comparing the ChangeDate property of the quota 503 with the ProcessDate property of bonus 501. In one embodiment, a quota instance includes a ChangeDate property. If nothing in the quota instance has changed, it is not necessary to check quota state Change Date values. A quota instance represents a single period of a quota and represents a "tie-back point" for all states for that period. Additionally, if the bonus 501 has dependent quotas 503, the ChangeDate property of each dependent quota 503 is also compared to the ProcessDate property of bonus 501 to determine if the bonus 501 should be processed due to a change in the dependent quota 503. If the bonus 501 has been processed since the last change in primary and dependent quota data, then operation 430 ends for the bonus 501 under consideration and proceeds to the next bonus. If no bonuses 234 need reprocessing, then the reprocessing operation 400 ends. If the primary quota 501 and/or any dependent quotas have changed since the bonus 501 was last processed by commission/bonus engine 208, then operation 506 determines whether any quota instances of the primary quota 501 and/or any dependent quotas thereof have quota instances. A "quota instance" is an instance of a quota for a particular period of time. In one embodiment, a primary quota determines the period definition that a bonus is calculated against, and a bonus has at least a primary quota. Secondary quotas are optional, to allow specifying (in bonus rules) that specific performance levels must be achieved in multiple quotas in order to get a reward.

Operation 430 evaluates each quota instance to determine whether the quota instance includes data that has changed since the last time bonus 501 was processed. If there are no remaining unevaluated quota instances, operation 430 ends as discussed above. If an unevaluated quota instance exists, operation 508 retrieves the next quota instance from database 238. In operation 510, if a retro-compensation request 212 exists for the bonus and a specific period in the bonus (sometimes referred to as a bonus/period combination), operation 510 proceeds directly to operation 516. Otherwise, operation 510 proceeds to operation 512, which determines whether the quota instance period overlaps with the bonus 501 and is, thus, applicable to bonus 501. If no, operation 512 returns to operation 506. If yes, operation 514 determines whether the ChangeDate of the quota instance is greater than the bonus 501 ProcessDate. If the bonus 501 has dependent quotas, the ChangeDate property of the dependent quotas' quota instances corresponding to the period of the primary quota's quota instance (QI) are also examined. The ChangeDate property of the dependent quotas' quota instances is compared to the ProcessDate property of bonus 501 to determine if the bonus 501 should be reprocessed due to a change within a dependent quota instance. If the outcome of operation 516 is "no", the process returns to operation 506. Otherwise, operation 516 evaluates whether the quota instance has more quota states. If not, the process returns to operation 506, otherwise operation 518 retrieves the next quota state.

If there is a retro-accumulation request 206 for the period of the bonus 501, then commission/bonus engine 208 will reprocess the bonus and quota states in operation 430 (FIG. 4). If the outcome is operation 520 is 'no', operation 522 checks whether the AlwaysProcess property of bonus 501 is set. In one embodiment, the QuotaState.ChangeDate check can be avoided by setting the Bonus.AlwaysProcess flag to true on the bonus. This causes all quota states in a changed period to be processed. If the AlwaysProcess property is set "true, bonus 501 is reprocessed in operation 430. If set "false", operation 524 determines whether the ChangeDate property of the quota state is later than the ProcessDate property of bonus 501. If "yes", the bonus 501 has not been processed in accordance with the new quota instance data. If not, the process returns to operation 516 to determine whether the quota instance has any unevaluated quota states. Otherwise, operation 526 identifies the bonus 501 for reprocessing.

It will be understood by those of ordinary skill in the art that operation 430 is an implementation based, in part, on the organizational design choices of compensation model 210. In essence, if data has been changed that affects previously generated compensation calculations, then an operation is conducted in accordance with the design of transaction objects and the compensation model 210 to filter through components affected by the changes in order to reduce the quantity of reprocessing operations. Thus, compensation system 200 is designed not only to detect retroactive changes affecting compensation but also efficiently select components for reprocessing.

Returning to FIG. 4, quota states are reprocessed against bonuses to produce updated ledger items 228. Operation 432 saves the updated ledger items 228 in database 238. In one embodiment, reprocessing occurs using the monotonic batch process described herein.

After the bonus/period combination specified by a retro-compensation request(s) 212 is processed, the request is marked as processed to prevent reprocessing and saved. The request is saved after all ledger items resulting from the reprocessing are saved, to ensure the reprocessing is complete.

The maximum number of transactions 230 to mark for reprocessing can be specified to, for example, prevent overloading the compensation system with reprocessing operations.

Table 4 lists retroactive consequences for illustrative changes made to data in the compensation system 200. In Table 4, all transactions are effectivity dated.

TABLE 4

| User Action | Retro Request | Processing |
|---|---|---|
| Mark a transaction 230 for reprocessing and modify one or more transaction 230 properties | No requests involved. The transaction 230 is added to a reprocessing batch. | Accumulation processing |
| Change the dates on a position holder in a compensation hierarchy in a compensation model. | All relevant transactions 230 for the affected date range(s). Relevant periods for all component bonuses. | 1. Process retro-accumulation request(s) 206<br>2. Accumulation processing<br>3. Compensation processing. |
| Remove or add a participant in participant data 214 | All transaction 230 for that participant Relevant periods for all component bonuses. | 1. Process retro-accumulation request(s) 206<br>2. Accumulation processing<br>3. Compensation processing. |
| Add a bonus to a component for a specified period range. | All periods for the new bonus. | Compensation processing. |
| Modify the dates or bonus rule formula on a bonus rule. | All periods for that bonus. | Compensation processing. |
| Modify the dates or the formula on an eligibility rule or create a new eligibility rule. | All relevant transactions 230 for the affected date range(s). | 1. Process retro-accumulation request(s) 206<br>2. Accumulation processing<br>3. Compensation processing, |
| Modify the dates or the formula on a quota measure segment or create a new measure segment. | All transactions 230 that yielded a quota detail for that quota for the affected date range(s). | 1. Process retro-accumulation request(s) 206<br>2. Accumulation processing<br>3. Compensation processing, |
| Truncate or extend the scope of a bonus. | All affected periods for that bonus. | Compensation processing. |
| Truncate or extend the scope of a quota. | All relevant transactions for the affected date range(s). | 1. Process retro-accumulation request(s) 206<br>2. Accumulation processing<br>3. Compensation processing, |
| Change of target. | All affected periods for related bonuses. | Compensation processing. |
| Change or create an Allocation Rule (recipient, targets) | All relevant transactions for the affected date range(s). | 1. Process retro-accumulation request(s) 206<br>2. Accumulation processing<br>3. Compensation processing. |
| Change an Allocation Rule weight formula. | All transactions 230 that produced Allocations from that rule for the affected date range(s). | 1. Process retro-accumulation request(s) 206<br>2. Accumulation processing<br>3. Compensation processing. |

Batch Processing

In one embodiment, the commission/bonus engine 208 processes transactions 230 in batches. Transactions 230 are grouped into batches by the BatchNumber property. All transactions 230 with the same BatchNumber belong to the same batch and are processed together.

In one embodiment, each compensation model 210 includes a CurrentBatch property. When the commission/bonus engine 208 loads a compensation model 210 model, it examines the model's CurrentBatch property. The CurrentBatch property value is 2+[the BatchNumber of the transaction batch most recently processed against the model], the number of the next batch that will be considered. During processing, the commission/bonus engine 208 looks for transactions 230 belonging to the compensation model 210 that have a BatchNumber greater than or equal to the compensation model 210 $_{CurrentBatch}$ Value.

To prevent overloading commission/bonus engine 208 with reprocessing transactions, the total number of transactions that will be batched for reprocessing can be set at a predetermined value, for example, 2,000, so that only up to 2,000 transactions will be processed across one or more batches.

Batch records, among other things, identify transactions 230 as requiring reprocessing (as opposed to regular processing). To be reprocessed, transactions 230 must be added to an existing batch that is not full and is marked for reprocessing, or a new batch that is marked for reprocessing.

A BatchRecord class represents information common to a batch of compensation transactions 230. The batch record consolidates information common to the transactions 230 in a batch to reduce storage size (instead of storing the properties on each Transaction 230). The batch record is associated with its compensation transactions 230 by the BatchNumber property on BatchRecord and Transaction 230.

A batch record indicates if a given batch of transactions 230 is to be processed for the first time, or if it is to be reprocessed due to retroactive changes by its Reprocess property. This is how the commission/bonus engine 208 determines if the transactions 230 must be processed in a retroactive mode.

Table 5 describes the properties of the BatchRecord class.

TABLE 5

| Property | Description |
|---|---|
| BatchNumber | The batch number. In one embodiment, batch numbers are assigned in monotonically increasing order. The commission/bonus engine 208 only processes transactions 230 that have a batch number greater than or equal to the CurrentBatch value of the Model. A batch is associated with its transactions 230 through the corresponding BatchNumber property on transaction 230. |
| BegunDate | The date on which the batch started to be processed. The value is null if processing has not started. |
| CompletedDate | The date compensation processing completed for this batch. The value is null if processing has not completed. |
| CreatedDate | The date on which this batch record was created. |
| Exception | The text of any exception that terminated processing of this batch., The value is null if processing has not started or no fatal exceptions occurred. |
| Model | The model with which the batch and its transactions 230 are associated. |
| NTransactions | The number of transactions 230 in a batch. It is used when adding individual transactions 230 to a batch for reprocessing. |
| Reprocess | If true, indicates the transactions 230 are to be reprocessed. If false, indicates the transactions 230 are to be processed regularly (initial processing.) |

When transactions 230 are retroactively changed using any of editor mechanisms 202, validator 226 automatically adds the transaction 230 to either an existing or a new batch that is marked for reprocessing. This ensures the transaction 230 will be reprocessed the next time accumulation is run.

Monotonically increasing strategies assign new batches a value of 2+[the largest batch number in the database]. With a monotonically increasing strategy, the commission/bonus engine 208 processes batches of compensation transactions 230 whose batch number is greater than or equal to the Model.CurrentBatch property, which is a property of the compensation model 210 that identifies the current batch number currently (or available) for reprocessing. A related strategy causes the commission/bonus engine 208 to poll the database 238 periodically, for example, every 5 seconds, to check for new transactions 230 or a new batch strategy. Polling allows adding transaction 230 inputs to the database 230 while the commission/bonus engine 208 is processing.

Some retroactive changes compensation model 210 can require reprocessing a large volume of transactions 230. Reprocessing of the transactions 230 can be broken up over different time periods to stay within allowed processing times. The transactions 230 to be reprocessed are limited by specifying a maximum number of transactions 230 to mark for reprocessing. In one embodiment, transactions 230 that have already been marked for reprocessing are not considered when setting a maximum number of transactions 230 to mark.

The commission/bonus engine 208 will process requests until the maximum number of transactions 230 marked has been reached, or no more retro-accumulation request(s) 206 objects to be processed exist. It is possible that not all transactions 230 associated with a retro-accumulation request(s) 206 will get marked if the limit is reached. In this case, the retro-accumulation request(s) 206 is left in an unprocessed state so processing will continue the next time requests are processed.

Following is an example where the following AccumRequest objects have not yet been processed:

| AccumRequest Object | A | B | C |
|---|---|---|---|
| # of Transactions 230 to be reprocessed | 700 | 800 | 600 |

Assume the maximum number of transactions 230 to mark has been set at 2000, and assume the requests are processed in the order of A, B, C. When the request objects are processed the first time, all of the transactions 230 identified y request A will be marked for reprocessing, and A will be marked as processed. As request B is being processed, the maximum number of transactions 230 will be reached, so only 400 of the 800 identified transactions 230 will be marked for reprocessing, and B will be left in an unprocessed state. Request C will not be processed.

The next time the request objects are processed, A will be ignored since it is in a processed state. B will be processed; its remaining 500 transactions 230 will be marked for reprocessing, and B will be marked as processed. The 400 transactions 230 that were already marked in B during the first processing round are not processed again because they will already have batch numbers greater than or equal to the CreationBatchNumber property of the request, and are ignored. As request C is being processed, the maximum number of transactions 230 will be reached, so only 500 of the 600 identified transactions 230 will be marked for reprocessing, and C will be left in an unprocessed state. The remaining 200 transactions 230 identified by C will be marked the next time requests are processed.

Requests can potentially overlap by identifying some of the same transactions 230 for reprocessing. In this case, transactions 230 typically only get marked and reprocessed once because when the first request is processed, the transactions 230 are given a batch number greater than or equal to the CreationBatchNumber property of the existing requests since the transactions 230 are given a batch number greater than or equal to the CurrentBatch property of the Model. This means future requests will ignore the previously marked transactions 230 when they are processed. A transaction 230 will only be reprocessed more than once if an additional request is created after the transaction 230 has been reprocessed.

Orphan Ledger Sums

Some retroactive changes can result in orphan ledger sums that must be balanced. For example, if a distributor participated in and received payments from a bonus or commission, and was later retroactively removed, a ledger item must be produced to balance the payments (resulting in a net payment of zero). The following situations can cause orphan ledger sums:

Removing a participant from a plan, bonus or commission
Reducing or deleting a participant's participation segments
Reducing the duration of a bonus In the last case, all ledger sums for the periods in which the bonus is no longer active are zeroed by the generation of new ledger items.

Associating Reprocessing Output with Retroactive Changes

In some situations, it may be desirable to isolate reprocessing outputs to identify them with the most recent set of retroactive changes. To isolate the outputs, first ensure all transactions 230 loaded in the compensation system 200 have been completely processed. Then, make the set of retroactive changes and perform the retroactive processing 400 before any new compensation transactions 230 are loaded into the compensation system 200. This will ensure that the outputs from reprocessing correspond only to the retroactive changes.

When reprocessing outputs are isolated, they can be associated with the set of retroactive changes by comparing the date and time of the processing outputs with the date and time of the retroactive changes. The first set of outputs after the time of the retroactive changes are the outputs generated as a result of the changes.

Figure 6:
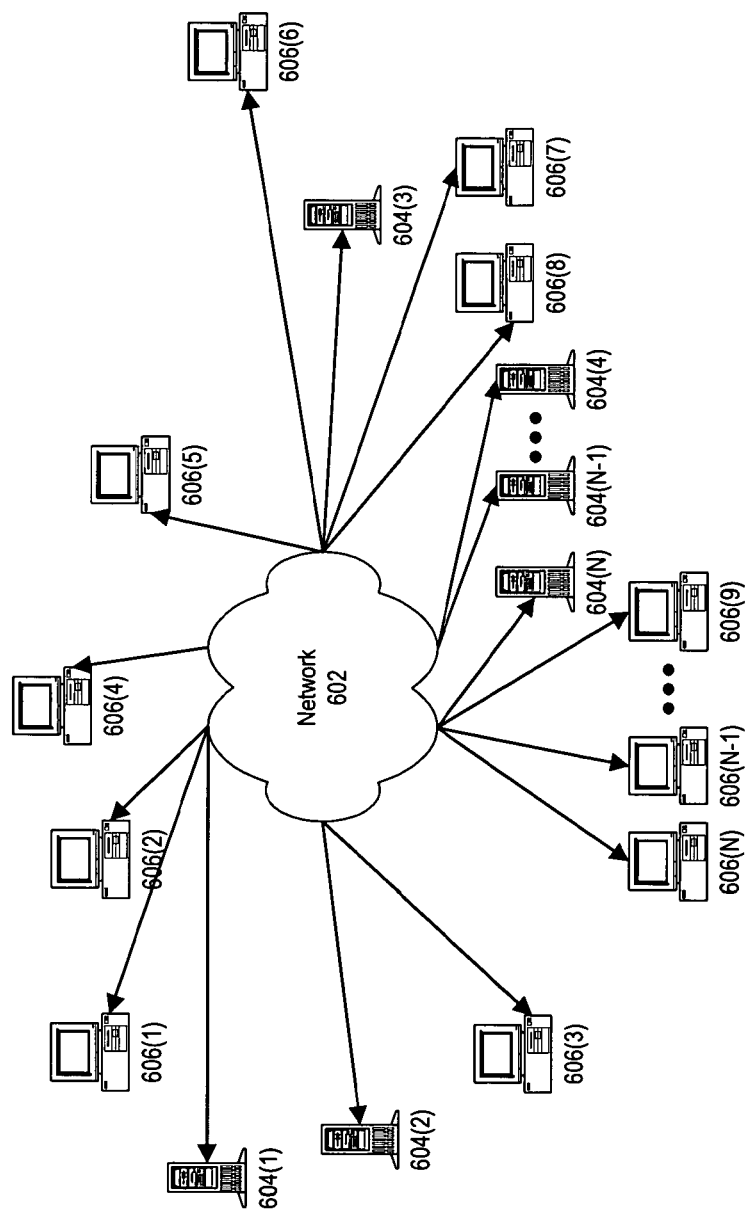
FIG. 6 depicts a block diagram illustrating a network environment in which a transaction processing system may be practiced.

FIG. 6 is a block diagram illustrating a network environment in which a transaction processing system may be practiced. Network 602 (e.g. a private wide area network (WAN) or the Internet) includes a number of networked server computer systems 604(1)-(N) that are accessible by client computer systems 606(1)-(N), where N is the number of server computer systems connected to the network. Communication between client computer systems 606(1)-(N) and server computer systems 604(1)-(N) typically occurs over a network, such as a public switched telephone network over asynchronous digital subscriber line (ADSL) telephone lines or high-bandwidth trunks, for example communications channels providing T1 or OC3 service. Client computer systems 606(1)-(N) typically access server computer systems 604(1)-(N) through a service provider, e.g., an Internet service provider by executing application specific software, commonly referred to as a browser, on one of client computer systems 606(1)-(N).

Client computer systems 606(1)-(N) and/or server computer systems 604(1)-(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output (I/O)" " devices coupled to the system processor to perform specialized functions. Mass storage devices such as hard disks, CD-ROM drives and magneto-optical drives may also be provided, either as an integrated or peripheral device. One such example computer system is shown in detail in FIG. 7.

Figure 7:
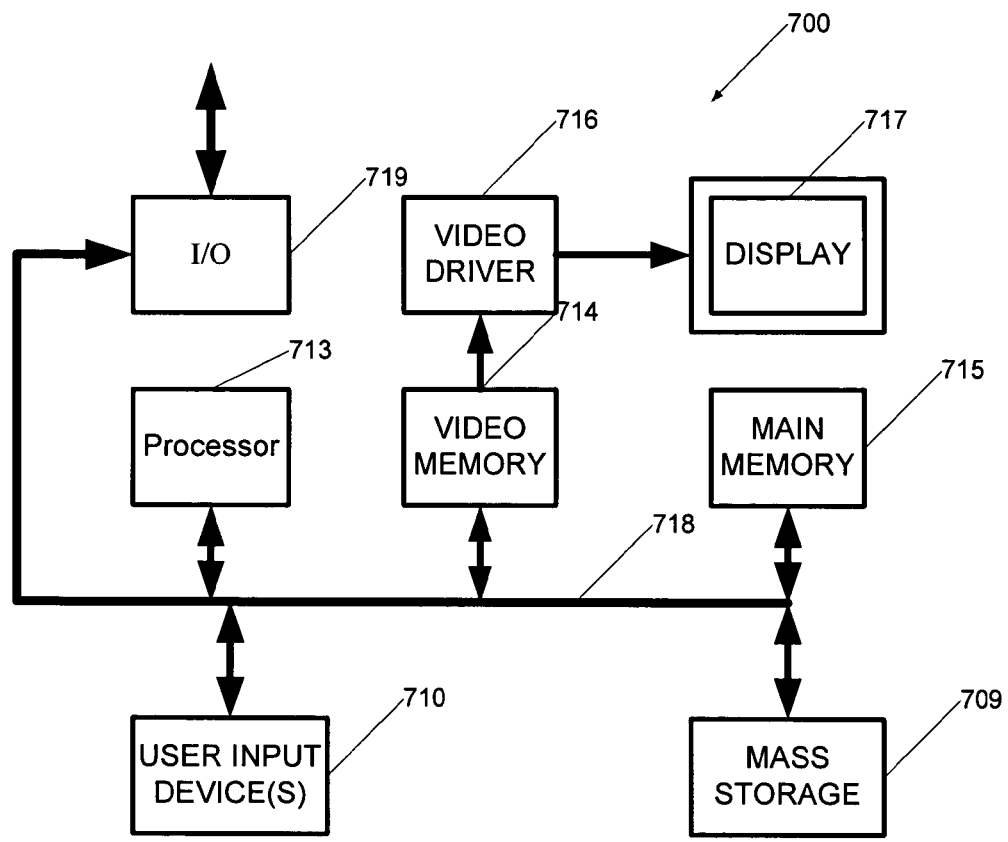
FIG. 7 depicts a general purpose computer block diagram.

Embodiments of the transaction processing system can be implemented on a computer system such as a general-purpose computer 700 illustrated in FIG. 7. Input user device(s) 710, such as a keyboard and/or mouse, are coupled to a bi-directional system bus 718. The input user device(s) 710 are for introducing user input to the computer system and communicating that user input to processor 713. The computer system of FIG. 7 also includes a video memory 714, main memory 715 and mass storage 709, all coupled to bi-directional system bus 718 along with input user device(s) 710 and processor 713. The mass storage 709 may include both fixed and removable media, such as other available mass storage technology. Bus 718 may contain, for example, 32 address lines for addressing video memory 714 or main memory 715. The system bus 718 also includes, for example, an n-bit DATA bus for transferring DATA between and among the components, such as CPU 709, main memory 715, video memory 714 and mass storage 709, where "n" is, for example, 32 or 64. Alternatively, multiplex DATA/address lines may be used instead of separate DATA and address lines.

I/O device(s) 719 may provide connections to peripheral devices, such as a printer, and may also provide a direct connection to a remote server computer systems via a telephone link or to the Internet via an internet service provider (ISP). I/O device(s) 719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 709 until loaded into main memory 715 for execution. Computer programs may also be in the form of electronic signals modulated in accordance with the computer program and data communication technology when transferred via a network. The method and functions relating to transaction processing system may be implemented in a computer program alone or in conjunction hardware.

The processor 713, in one embodiment, is a 32-bit microprocessor manufactured by Motorola, such as the 68060 processor or microprocessor manufactured by Intel, such as the 80686, or Pentium processor. However, any other suitable single or multiple microprocessors or microcomputers may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the display 717. Video amplifier 716 is well known in the art and may be implemented by any suitable means. This circuitry converts pixel DATA stored in video memory 714 to a raster signal suitable for use by display 717. Display 717 is a type of monitor suitable for displaying graphic images.

The computer system described above is for purposes of example only. The transaction processing system may be implemented in any type of computer system or programming or processing environment. It is contemplated that the transaction processing system might be run on a stand-alone computer system, such as the one described above. The transaction processing system might also be run from a server computer systems system that can be accessed by a plurality of client computer systems interconnected over an intranet network. Finally, the transaction processing system may be run from a server computer systems that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

In one embodiment, a method of efficient reprocessing transactions affected by data changes in a commission system includes receiving data in the commission system, determining if any of the received data alters any previous commission calculations, if any commission calculations were altered, identifying transactions associated with the altered previous commission calculations, and reprocessing the transactions determined to have been associated with the altered previous commission calculations. In a further embodiment, transactions are compared in memory without writing to a database.

What is claimed is:

1. A method of using an electronic data processing system to reprocess transaction data related to compensation of participants, the method comprising:
   executing code stored in memory of the electronic data processing system that causes the electronic data processing system to perform:
      determining that a compensation model has been changed;
      generating data queries to obtain values of multiple transaction data properties stored in a storage medium;
      determining if any of the values indicate that the changed compensation model affects previously processed transaction data so that current compensation data associated with the transaction data is no longer accurate;
      responsive to determining that the changed compensation model has affected the previously processed transaction data, issuing a retro-request to reprocess the affected, previously processed transaction data without reprocessing all previously processed transaction data stored in the storage medium;
      adding the retro-request for reprocessing to a batch of the affected, previously processed transaction data;

determining if the batch for reprocessing the retro-request is ready for reprocessing;

reprocessing the affected previously processed transaction data when the batch is ready for reprocessing to generate compensation data consistent with a change in information, including the change to the compensation model, affecting the previously processed transaction data; and storing the generated compensation data for subsequent compensation determination use.

2. The method of claim 1 wherein the information affecting previously processed transaction data is selected from the group comprising the transaction data properties and the compensation model that governs transaction processing.

3. The method of claim 2 wherein if the information affecting previously processed transaction data is a rules-data model that governs transaction processing changes, the method further comprises:

reprocessing the affected, previously processed transaction data for a particular time period affected by the change in the compensation model.

4. The method of claim 3 wherein:

the information comprises a plurality of components including compensation rules in the compensation model, compensation hierarchical information in the compensation model, and the transaction data properties;

the transaction data comprises a plurality of transactions;

each component of the information is effectivity dated; and the method further comprises:

using the effectivity dates of the components to determine if a change has been made to the information affecting the previously processed transaction data and to reprocess the affected, previously processed transaction data data.

5. The method of claim 1 wherein reprocessing the affected, previously processed transaction data comprises:

utilizing overload protection processes.

6. The method of claim 5 wherein the affected, previously processed transaction data comprises a plurality of transactions and utilizing overload protection processes comprises:

adding the affected, previously processed transaction data to the batch of retro-requests;

reprocessing the batch of retro-requests after the batch of retro-requests reaches a predetermined number of transactions; and adding affected, previously processed transaction data to another batch of retro-requests when a previously filled batch of retro-requests reaches the predetermined number of transactions, wherein the predetermined size is set to restrict the number of transactions to be reprocessed.

7. The method of claim 6 wherein utilizing overload protection processes further comprises:

limiting a number of batches of retro-requests to be reprocessed to a predefined number.

8. The method of claim 6 wherein adding affected, previously processed transaction data to the batch of retro-requests comprises:

assigning a batch number to each transaction in the added, affected, previously processed transaction data; and updating the batch number of each transaction in the added, affected, previously processed transaction data to be reprocessed with respective monotonically increasing batch numbers.

9. The method of claim 6 wherein reprocessing the batch of retro-requests further comprises:

processing a first subset of the plurality of affected, previously processed transaction data during a first period of time; and processing one or more additional subsets of the plurality of affected, previously processed transaction data during one or more subsequent periods of time.

10. The method of claim 6 further comprising:

assigning monotonically increasing numbers to each batch of retro-requests.

11. The method of claim 5 wherein utilizing overload protection processes further comprises:

receiving the retro-requests and reprocessing the affected, previously processed transaction data over a period of time to prevent overloading a compensation system with reprocessing operations.

12. The method of claim 1 wherein the change affecting previously processed transaction data comprises new transaction data effectivity dates.

13. The method of claim 1 wherein reprocessing the affected, previously processed transaction data comprises:

loading newly and previously generated compensation data into system memory of a computer system;

comparing newly generated compensation data with the previously generated compensation data; and wherein if a match between newly generated and previously generated compensation data occurs, discarding at least a portion of the newly generated compensation data and, if a match between newly generated and previously generated compensation data does not occur, canceling at least a portion of unmatched, previously generated compensation data and persisting at least a portion of the newly generated compensation data.

14. The method of claim 13 wherein each transaction comprises a plurality of properties and:

comparing the newly generated transaction data with the previously generated compensation data comprises comparing each value of the transaction data properties independently;

discarding at least a portion of the newly generated transaction data, wherein the discarding comprises discarding values of the transaction data properties of the newly generated compensation data that match values of the transaction data properties of corresponding values of the previously generated compensation data;

canceling at least a portion of unmatched, previously generated compensation data; and persisting the newly generated compensation data, wherein the persisting comprises canceling values of the transaction data properties of corresponding to the unmatched, previously generated compensation data and persisting unmatched values of the transaction data properties of corresponding properties of the newly generated compensation data.

15. The method of claim 1 further comprising:

changing the information through a user interface having access to the transaction data properties and a compensation model of the electronic data processing system.

16. The method of claim 1 further comprising:

changing the information by directly accessing the compensation model and entering changes to the compensation model.

17. The method of claim 16 wherein changes to the compensation model are selected from the group comprising: changes to quotas, bonuses, commissions, compensation hierarchies, allocation rules, and compensation participation.

18. The method of claim 16 wherein issuing the retro-request occurs automatically if a change has been made to the information affecting the previously processed transaction data.

19. A method of reprocessing transactions affected by data changes in a compensation system, the method comprising:
    executing code stored in memory of the compensation system that causes the compensation system to perform:
        receiving data in the compensation system;
        determining that a compensation model has been changed by the received data;
        determining if any of the received data alters any previous compensation calculations in accordance with the changed compensation model; and
        when compensation calculations are altered:
            generating queries to query multiple transaction data properties to identify transactions associated with the altered previous compensation calculations whose properties indicate that the changed compensation model affects the transactions so that current compensation data is no longer accurate;
            adding a retro-request for the identified transactions to a batch for reprocessing;
            determining if the batch of retro-requests is ready for reprocessing;
            when the batch is ready for reprocessing, reprocessing the identified transactions determined to have been associated with the altered previous compensation calculations; and
            storing results of reprocessing the identified transactions for subsequent compensation determination use.

20. A compensation method based on reprocessing transactions affected by data changes in a computer system, the method comprising:
    executing first code stored in a first memory of the computer system that causes the computer system to perform:
        receiving compensation information from a compensation system to perform compensation determination processes, wherein the compensation information is generated by the compensation system executing second code stored in a second memory of the compensation system that causes the compensation system to perform:
            receiving data in the compensation system;
            determining that a compensation model has been changed by the received data;
            determining if any of the received data alters any previous compensation calculations in accordance with the changed compensation model; and
            when compensation calculations are altered:
                generating queries to query multiple transaction data properties to identify transactions associated with the altered previous compensation calculations whose properties indicate that the changed compensation model affects the transactions so that current compensation data is no longer accurate;
                adding a retro-request for the identified transactions to a batch for reprocessing;
                determining if the batch of retro-requests is ready for reprocessing;
                when the batch is ready for reprocessing, reprocessing the identified transactions determined to have been associated with the altered previous compensation calculations; and
                providing results of the reprocessing of the identified transactions as compensation information to the computer system.

* * * * *